US009232075B2

(12) United States Patent
Okamoto et al.

(10) Patent No.: US 9,232,075 B2
(45) Date of Patent: Jan. 5, 2016

(54) MOBILE TELEPHONE DEVICE WITH SCREEN LUMINANCE AND SOUND VOLUME CONTROL

(71) Applicant: KYOCERA CORPORATION, Kyoto (JP)

(72) Inventors: Miyuki Okamoto, Osaka (JP); Tsurumi Ito, Gifu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/286,611

(22) Filed: May 23, 2014

(65) Prior Publication Data

US 2014/0256385 A1    Sep. 11, 2014

Related U.S. Application Data

(60) Continuation of application No. 12/783,501, filed on May 19, 2010, now abandoned, which is a division of application No. 10/581,319, filed as application No. PCT/JP2004/017691 on Nov. 29, 2004, now Pat. No. 7,746,409.

(30) Foreign Application Priority Data

Dec. 5, 2003    (JP) ................................ 2003-407408

(51) Int. Cl.
*H04M 1/725*    (2006.01)
*H04M 1/02*    (2006.01)
(Continued)

(52) U.S. Cl.
CPC .......... *H04M 11/085* (2013.01); *H04M 1/0266* (2013.01); *H04M 1/72563* (2013.01); *H04N 21/47* (2013.01)

(58) Field of Classification Search
None
See application file for complete search history.

(56) References Cited

U.S. PATENT DOCUMENTS

| 5,479,476 A | 12/1995 | Finke-Anlauff |
| 5,890,071 A | 3/1999 | Shimanuki |

(Continued)

FOREIGN PATENT DOCUMENTS

| CN | 1261241 A | 7/2000 |
| EP | 1204262 A2 | 5/2002 |

(Continued)

OTHER PUBLICATIONS

Decision on Appeal dated May 29, 2012 from corresponding Japanase Patent Application No. 2003-407408, 32 pages total.

(Continued)

*Primary Examiner* — Simon Sing
*Assistant Examiner* — Jeffrey Lytle
(74) *Attorney, Agent, or Firm* — Duane Morris LLP

(57) ABSTRACT

A flash memory in a memory (9) connected to a baseband chip (3) stores related information on an image/sound in a telephone mode (contrast information, screen luminance information, and sound volume information in the telephone mode), and related information on an image/sound in a television-viewing mode (contrast information, screen luminance information, and sound volume information in the television-viewing mode). In the telephone mode, a display device (6) and a speaker unit (7) are driven based on the related information on the image/sound in the telephone mode. In the television-viewing mode, the display device (6) and the speaker unit (7) are driven based on the related information on the image/sound in the television-viewing mode.

8 Claims, 2 Drawing Sheets

(51) Int. Cl.
*H04N 21/47* (2011.01)
*H04M 11/08* (2006.01)

(56) References Cited

U.S. PATENT DOCUMENTS

| | | | |
|---|---|---|---|
| 6,278,887 B1* | 8/2001 | Son et al. | 455/566 |
| 6,281,925 B1* | 8/2001 | Kosaka | 348/14.02 |
| 6,529,742 B1 | 3/2003 | Yang | |
| 6,538,686 B2 | 3/2003 | Hara et al. | |
| 6,775,361 B1* | 8/2004 | Arai et al. | 379/93.17 |
| 6,826,413 B1 | 11/2004 | Nakatsuchi et al. | |
| 6,829,494 B2* | 12/2004 | Tanabe | 455/574 |
| 6,891,525 B2 | 5/2005 | Ogoro | |
| 7,346,376 B2 | 3/2008 | Hamamura et al. | |
| 2001/0004269 A1 | 6/2001 | Shibata et al. | |
| 2001/0006390 A1 | 7/2001 | Tanabe | |
| 2001/0012051 A1 | 8/2001 | Hara et al. | |
| 2001/0013854 A1 | 8/2001 | Ogoro | |
| 2002/0032044 A1 | 3/2002 | Kume | |
| 2002/0036637 A1 | 3/2002 | Ogawa | |
| 2002/0126780 A1 | 9/2002 | Oshima et al. | |
| 2002/0137478 A1 | 9/2002 | Masamura | |
| 2002/0163592 A1 | 11/2002 | Ueda | |
| 2004/0055011 A1* | 3/2004 | Bae et al. | 725/62 |
| 2004/0072589 A1 | 4/2004 | Hamamura et al. | |
| 2004/0097261 A1 | 5/2004 | Ujii | |
| 2005/0093958 A1 | 5/2005 | Mori et al. | |
| 2007/0109262 A1 | 5/2007 | Oshima et al. | |

FOREIGN PATENT DOCUMENTS

| | | |
|---|---|---|
| EP | 1647804 A1 | 4/2005 |
| GB | 2347051 A | 8/2000 |
| GB | 2365691 A | 2/2002 |
| JP | 03087539 A | 4/1991 |
| JP | 06-120864 A | 4/1994 |
| JP | 08-125723 A | 5/1996 |
| JP | 09298703 A | 11/1997 |
| JP | 11-027787 A | 1/1999 |
| JP | 11-126118 A | 5/1999 |
| JP | 11-184576 A | 7/1999 |
| JP | 2001-333153 A | 11/2001 |
| JP | 2002094656 A | 3/2002 |
| JP | 2002099248 A | 4/2002 |
| JP | 2002218019 A | 8/2002 |
| JP | 2002-271281 A | 9/2002 |
| JP | 2002-354373 A | 12/2002 |
| JP | 2003037656 A | 2/2003 |
| JP | 2003076455 A | 3/2003 |
| JP | 2003-274301 A | 9/2003 |
| JP | 2003-274313 A | 9/2003 |
| JP | 2003-283956 A | 10/2003 |
| JP | 2003-347869 A | 12/2003 |
| WO | WO-01/43403 A1 | 6/2001 |
| WO | WO-03/081567 A1 | 10/2003 |

OTHER PUBLICATIONS

Decision on Appeal dated May 21, 2013 from corresponding Japanese Patent Application No. 2010-009928 (statement of relevance included), 14 pages total.

International Search Report dated Feb. 1, 2005, from corresponding International Patent Application No. PCT/JP2004/017691, 2 pages.

International Preliminary Report on Patentability dated Aug. 3, 2006, from corresponding International Patent Application No. PCT/JP2004/017691, 5 pages.

Office Action dated May 28, 2008, from corresponding UK Patent Application No. GB0612235.2, 4 pages.

Office Action dated Sep. 11, 2008 from corresponding UK Patent Application No. GB0612235.2, 2 pages.

Office Action dated May 10, 2011 from corresponding Japanese Patent Application No. 2010-009928, 2 pages.

Office Action dated Aug. 2, 2011, from corresponding Japanese Patent Application No. 2003-407408, 6 pages.

Office Action dated Jan. 31, 2012, from corresponding Japanese Patent Application No. 2003-407408, 3 pages.

Office Action dated Nov. 5, 2013 from corresponding Japanese Patent Application No. 2012-084114 (statement of relevance included), 5 pages total.

Office Action dated Nov. 19, 2013 from corresponding Japanese Patent Application No. 2013-098010 (statement of relevance included), 4 pages total.

* cited by examiner

MOBILE TELEPHONE DEVICE WITH SCREEN LUMINANCE AND SOUND VOLUME CONTROL

CROSS-REFERENCE TO RELATED APPLICATIONS

This is a Continuation of U.S. patent application Ser. No. 12/783,501 filed on May 19, 2010, currently pending, which is a division of U.S. patent application Ser. No. 10/581,319 filed Jun. 2, 2006, which issued as U.S. Pat. No. 7,746,409 on Jun. 29, 2010, which is a U.S. National Phase Application of International Application No. PCT/JP2004/017691 filed Nov. 29, 2004, which claims priority to Japanese Patent Application No. 2003-407408 filed Dec. 5, 2003, the disclosures of which are incorporated herein by reference in their entireties.

FIELD OF THE INVENTION

The present invention relates to a mobile telephone device provided with a television-viewing function.

BACKGROUND ART

Mobile telephone devices are provided with a color liquid crystal display as a display device for displaying thereon a standby screen, and a transmission/reception screen, etc., in a telephone mode, and the luminance of a displaying can be set on its menu screen, for example. Moreover, the sound volume of a ringtone, too, can be set on the menu screen. These settings adjust the driver of the display and the amplifier of a speaker. Furthermore, in recent years, there has been proposed a mobile telephone device provided with a television broadcast-viewing function (see Japanese Patent Laying-open H11-184576), in which video based on broadcast reception is supplied to the driver of the display, and audio based on the broadcast reception is supplied to the amplifier of a speaker.

DISCLOSURE OF THE INVENTION

Problem to be Solved by the Invention

However, in the conventional devices, settings of the display and the amplifier of a speaker are affected by those of a telephone device. As a result, the video based on the broadcast reception is displayed with low contrast when the contrast of a standby screen is set low, and the audio based on the broadcast reception is output at the maximum value based on the set value when the sound volume of a ringtone is set at the maximum value. In addition, when a low luminance setting for lowering a screen luminance with passage of a time period is set for saving an electric power consumption, the screen is automatically changed to the low luminance screen while a television broadcast is being viewed.

In view of the above circumstances, an object of the present invention is to comfortably view a television broadcast on a mobile telephone device provided with a television broadcast-viewing function.

Means to Solve the Problem

In order to solve the above problem, a mobile telephone device provided with a television broadcast-viewing function according to the present invention comprises a memory for storing setting information on an image in a television broadcast viewing mode and setting information on an image in a telephone mode, and a controller for reading out, in the television broadcast viewing mode, the setting information on the image in the television broadcast viewing mode from the memory so that a setting of a display device is made, and for reading out, in the telephone mode, the setting information on the image in the telephone mode from the memory so that a setting of the display device is made.

With the above-described configuration, the settings of the image can differ depending on the telephone mode or the television broadcast viewing mode, thereby making it possible to comfortably view the television broadcast.

The setting information on the image may include at least one of a screen luminance setting and a contrast setting. Moreover, the setting information on the image in the telephone mode can be set to include low luminance setting information for lowering the screen luminance with passage of a time period, while the setting information on the image in the television broadcast viewing mode can be set not to include the low luminance setting information or to include different low luminance setting information.

The mobile telephone device provided with a television broadcast-viewing function according to the present invention comprises a memory for storing setting information on a sound in a television broadcast viewing mode and setting information on a sound in a telephone mode, and a controller for reading out, in the television broadcast viewing mode, the setting information on the sound in the television broadcast viewing mode from the memory so that a setting of a sound output portion is made, and for reading out, in the telephone mode, the setting information on the sound in the telephone mode from the memory so that a setting of the sound output portion is made.

With the above-described configuration, the settings of the sound can differ depending on the telephone mode or the television broadcast viewing mode, thereby making it possible to comfortably view the television broadcast.

The setting information on the sound may include at least a sound volume setting. The setting information on the sound in the telephone mode can be set to include setting information for outputting a ringtone at a predetermined sound volume, while the setting information on the sound in the television broadcast viewing mode can be set not to include the setting information for outputting the ringtone, or to include different sound volume information.

Effects of the Invention

According to the present invention, the settings of the image and the sound can differ depending on the telephone mode or the television broadcast viewing mode, thereby making it possible to comfortably view the television broadcast.

DESCRIPTION OF THE NUMERALS 3 baseband chip (BB)
4 tuner
5 application processor (APP)
6 display device 7 speaker unit
8 input unit Best Mode For Carrying Out The Invention Hereinafter, an embodiment of the present invention will be described with reference to FIG. 1 and FIG. 2.

Figure 1:
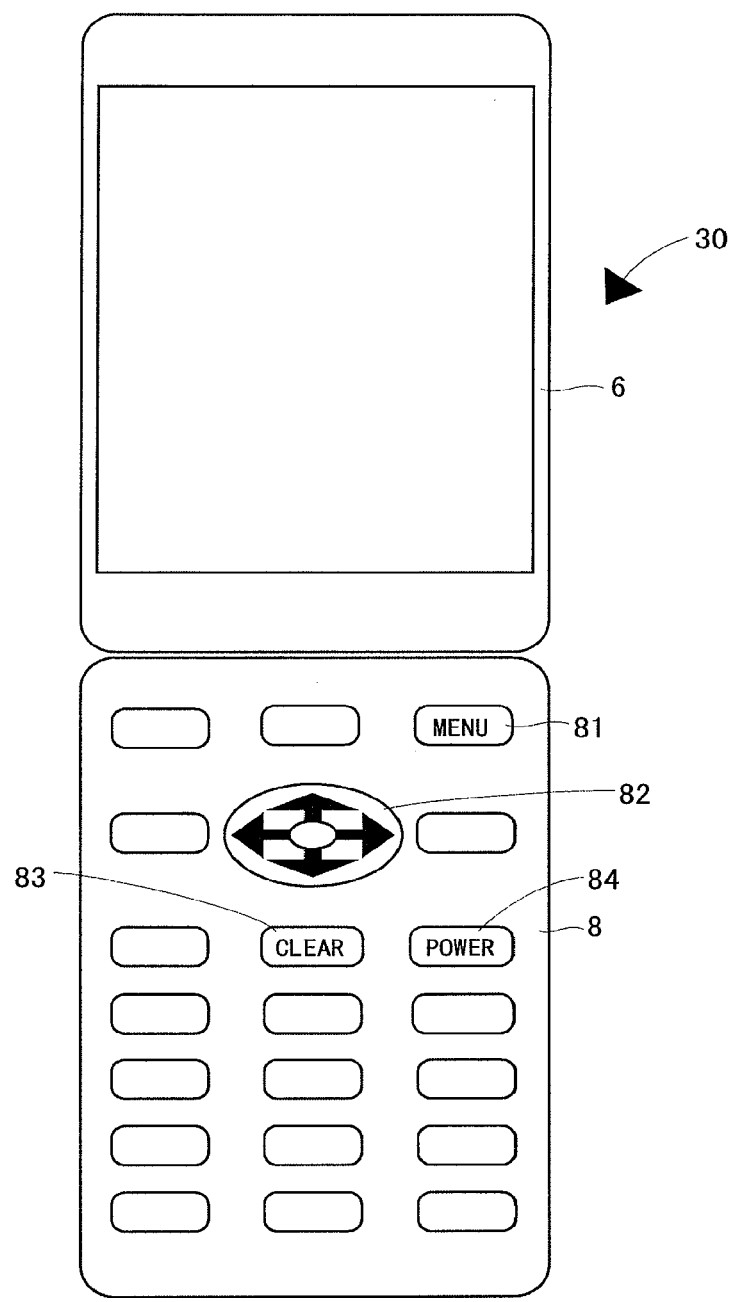
FIG. 1 is a descriptive diagram showing the appearance of a mobile telephone device according to an embodiment of the present invention.

FIG. 1 is a diagram showing the appearance of a mobile telephone device 30 provided with a broadcast receiving function according to an embodiment of the present invention, and mainly illustrates a display device (a liquid crystal display, for example) 6 and a key arrangement in an input unit 8. On the display device 6, results of processes by a baseband chip 3 and an application processor 4 described later are displayed. The input unit 8 is provided with a menu key 81, a cross key (with an OK key) 82, a clear (CLR) key 83, a power key 84, and the like. Depressing key portions representing left, right, up, and down directions on the cross key (with the OK key) 82 allows a cursor to move in left, right, up, and down direction, respectively, and depressing the central portion of the cross key straight down allows the key to function as the OK key.

Figure 2:
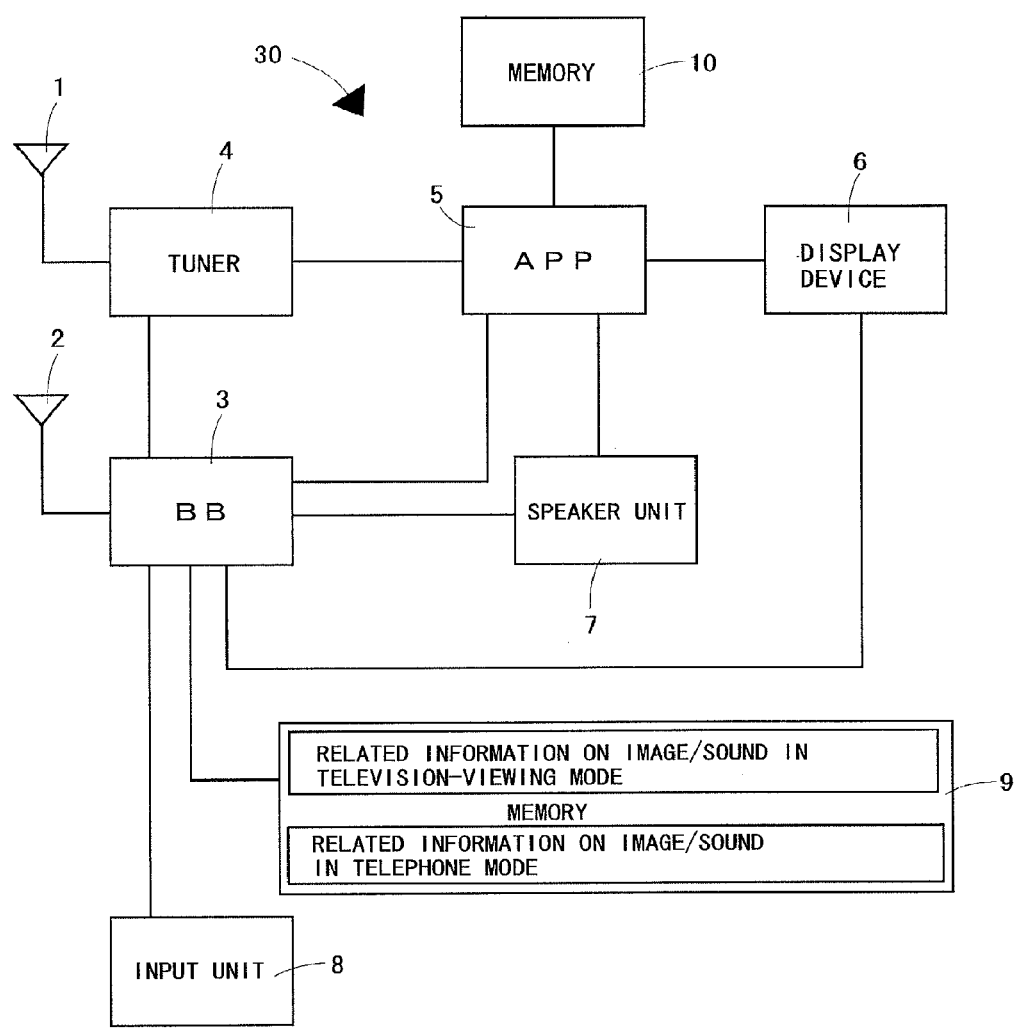
FIG. 2 is a block diagram showing the configuration of a mobile telephone device according to an embodiment of the present invention.

FIG. 2 is a block diagram showing the circuit configuration of the mobile telephone device 30. The numeral 1 represents an antenna for receiving a television broadcast wave, and the numeral 2 represents an antenna for transmitting and receiving a radio wave of a mobile telephone. In some configurations, it is possible that one of the antennas 1, 2 receives both radio waves.

A tuner module 4 performs a process for receiving a digital television broadcast wave and demodulating a modulated wave, for example. The application processor (APP) 5 performs a digital television reception process. The application processor 5 is a processor for executing a function for receiving demodulated data from the tuner module 4 to generate video and audio, and other functions necessary for operation of a digital television, and is constructed of an LSI in which a CPU for executing these functions and a process circuit for decoding video data such as MPEG4, etc., and audio data such as AAC, etc., are combined.

The baseband chip (BB) 3 is a chip for controlling outgoing and incoming calls, calling, a network connection, and the like, of the mobile telephone, and is formed of an LSI in which a CPU and various circuits for performing processes necessary for the mobile telephone such as modulation and demodulation, a signal process, and a call process are combined. In addition, in this embodiment, the baseband chip (BB) 3 creates a standby screen, a call screen, an electronic mail screen (creation/reception) and the like.

A memory 9 is connected with the baseband chip 3, and a memory 10 is connected with the application processor 5. Each memory 9, 10 is constructed of a flash memory (non-volatile memory) for storing a program and various setting data and a work DRAM. The display device 6 is connected to the baseband chip 3 and the application processor 5, and displays the process results of the baseband chip 3 and the application processor 5. A speaker unit 7 is connected to the baseband chip 3 and the application processor 5, and outputs audio (including a ringtone) based on output audio signals output therefrom. The input unit 8 is provided with various kinds of keys described later, and connected to the baseband chip 3.

The display device 6 is provided with a liquid crystal display panel, a backlight, and a driver, for example. The driver, in addition to driving the liquid crystal display panel based on input video data, performs driving control of the panel based on specified contrast setting information, and controls a light-emitting amount (electric power to be supplied) of the backlight based on specified luminance setting information.

The speaker unit 7 is formed of a D/A (digital to analog) converter for converting input audio data into an analog audio signal, an amplifier for amplifying the analog audio signal, and a speaker, for example. The amplifier amplifies the analog audio signal based on a specified amplification factor (sound volume setting information).

When detecting a user operation for requesting television-viewing (this request may include operation of a "TV button" provided on the input unit 8, besides a request on the menu screen, for example), the baseband chip 3 not only instructs the application processor 5 to perform the broadcast reception process, but also executes a process for switching inputs of the display device 6 and the speaker unit 7 to the application processor 5 side. Both baseband chip 3 and application processor 5 can determine that the present state is in a television-viewing mode or telephone mode.

The flash memory in the memory 9 connected to the baseband chip 3 stores pieces of related information on the image/sound (contrast information, screen luminance information, sound volume information, etc.) in the telephone mode (including a standby, the creation of an electronic mail, various kinds of settings, etc., other than the television-viewing mode). These pieces of information can be changed by the user operation (the operation on menu screen, and the like).

In addition, in this embodiment, the flash memory in the memory 9 connected to the baseband chip 3 also stores pieces of related information on the image/sound in the television-viewing mode (contrast information, screen luminance information, sound volume information, etc., in the television-viewing mode). The baseband chip 3 reads out from the memory 9 the related information on the image/sound in the television-viewing mode, and applies the related information to the application processor 5 when instructing the application processor 5 to perform the broadcast reception process.

Next, the processes by the baseband chip 3 and the application processor 5 will be described. When the power source of the mobile telephone device 30 is turned on, the baseband chip 3 firstly performs an initializing process. In the initializing process, the memory (DRAM) is cleared, the input unit 8 is initialized, and the display device 6 and the speaker unit 7 are initialized, for example. When the display device 6 and the speaker unit 7 are initialized, the baseband chip 3 performs the settings of the driver of the display device 6 and the speaker unit 7 based on the related information, which is read out from the memory 9, on the image/sound in the telephone mode. The driver performs a setting for brightness (supplied power) of the backlight based on the screen luminance information, etc., for example, and the speaker unit 7 performs an amplification factor setting. When the initializations are completed, the standby screen is displayed, waiting for events to happen. The events include a key inputting, a calling-in, an incoming of an electronic mail, a checking of a battery by a timer, etc. When an event occurs, the process varies depending on kinds of events. When it is determined that the event is a depressing of the menu key 81, the baseband chip 3 displays the main menu on the display device 6.

The baseband chip 3 determines a key code generated when each key of the input unit 8 is operated. When the key code is a key code generated when the upper end of the cross key 82 is depressed (key code of an upper direction key), for example, the baseband chip 3 moves the cursor on the menu screen in the upper direction, and when the key code is a key code generated when the center portion of the cross key 82 (key code of an OK key) is depressed, the baseband chip 3 proceeds to execute the content of an item at the cursor. When the item is "television-viewing", the baseband chip 3 activates the application processor 5, and informs the application processor 5 of a starting command of the television-viewing function. According to this command, the application processor 5 starts the television-viewing process.

In addition, when informing of the above command, the baseband chip 3 reads out from the memory 9 the related information on the image/sound in the television-viewing mode and applies the related information to the application processor 5. The application processor 5 writes the related information into the memory 10 (DRAM), and performs the settings for the driver of the display device 6 and the speaker unit 7 based on the related information. The above driver performs the setting for brightness (supplied power) of the backlight, for example, based on the screen luminance information, which is the related information, and the speaker unit 7 performs the amplification factor setting. Subsequently, the application processor 5 applies the video data received from the tuner 4 to the driver of the display device 6, and applies the received audio data to the speaker unit 7.

In the television-viewing mode, up and down direction keys on the cross key 81 should function as channel up/down keys, and left and right keys should function as sound volume up/down keys, for example. The baseband chip 3 transfers the input key code to the application processor 5. The application processor 5 determines the request based on the transferred key code, and performs processes of the channel up/down and the sound volume up/down. The application processor 5 writes a set value changed by this up/down process into the memory 10 (DRAM), when the sound volume up/down process is performed. The application processor 5 sends the changed set value to the baseband chip 3 at each time, or sends a final set value when the television-viewing mode is terminated. The baseband chip 3 stores (rewrites) the received changed or final set value as a new set value in the memory 9.

In addition, in this embodiment, when the user continues depressing a certain key when viewing television, the baseband chip 3 determines this continued depression of the certain key, and applies this depression information of the certain key to the application processor 5. When the depression information indicates a contrast setting, the application processor 5 generates an image in which the present contrast value is overlapped (superimposed) on a received program screen. Furthermore, when the key code of the cross key 82 is transmitted to the application processor 5 via the baseband chip 3, the application processor 5 changes the set value for the contrast based on the key code. The application processor 5 writes a changed set value into the memory 10 (DRAM) when the set value for the contrast is changed. The application processor 5 sends the changed set value to the baseband chip 3 at each time, or sends a final set value when the television-viewing mode is terminated. The baseband chip 3 stores (rewrites) the received changed or final set value as a new set value in the memory 9.

The baseband chip 3 outputs a preset ringtone from the speaker unit 7, when there is the incoming call in the telephone mode (standby state). The sound volume is based on the related information on the image/sound in the telephone mode stored in the memory 9. In addition, if a vibration is set, a vibrator not shown is driven when the incoming call arrives. On the other hand, the baseband chip 3 performs a process based on the related information on the image/sound in the television-viewing mode stored in the memory 9, when there is the incoming call in the television-viewing mode. When the related information indicates "there is no ringtone", the ringtone is not output from the speaker unit 7. Or, when the related information indicates "there is the ringtone", the baseband chip 3 changes over the speaker unit to its own side, and drives the speaker unit 7 based on ringtone volume information in the television-viewing mode. The ringtone volume information may be set by the user so that the volume of the ringtone is lower than that of the ringtone in the telephone mode.

When the standby screen of the telephone mode is displayed, the baseband chip 3 drives the display device 6 at a high luminance level, and at the same time, starts counting a timer and drives the display device 6 at a low luminance level with passage of a predetermined time period. Information on the predetermined time period is based on the related information on the image/sound in the telephone mode stored in the memory 9. On the other hand, when the baseband chip 3 allows the application processor 5 to perform the television-viewing process, and there is the information on the predetermined time period as the related information on the image/sound in the television-viewing mode, this information is sent to the application processor 5. Thereby, the standby screen in the telephone mode is changed to a low luminance display in about five seconds, and a received-program screen in the television-viewing mode is changed to a low luminance display in 30 minutes. Luminance information for displaying at a low luminance level may be stored as the related information on the image/sound in the television-viewing mode. Moreover, when there is no information on the predetermined time period as the related information on the image/sound in the television-viewing mode, the information on the predetermined time period is not sent to the application processor 5, thereby allowing the display device 6 to maintain a certain luminance without a time restriction.

In addition, although the process is shared by the CPU of the baseband chip 3 and the CPU of the application processor 5, a single CPU alone may execute both processes of the telephone and television-viewing modes. Of course, there are other methods of sharing the process besides the example described above. Furthermore, although the related information on the image/sound in the television-viewing mode is stored in the memory 9 (nonvolatile memory) connected to the baseband chip 3 in the above embodiment, the related information may be stored in the memory 10 (nonvolatile memory) connected to the application processor 5.

What is claimed is:

1. A mobile telephone device provided with a video display mode displaying a video based on video data, and a telephone mode, comprising:
   a display module;
   a sound output module;
   a memory for storing first display setting information and first sound setting information in the video display mode and second display setting information and second sound setting information in the telephone mode, wherein the second display setting information is configured to be set by a user input to provide a luminance that is greater than zero; and
   a controller for controlling the display module and the sound output module based on the first display setting information and the first sound setting information during the video display mode, and for controlling the display module and the sound output module based on the second display setting information and the second sound setting information during the telephone mode,
   wherein the second display setting information comprises information for lowering a screen luminance of the display module with passage of a first time period such that the image in the telephone mode continues to be displayed on the display module with reduced luminance, and the first display setting information comprises information for not lowering the screen luminance of the display module with passage of the first time period when the video in the video display mode is displayed on the display module.

2. A mobile telephone device according to claim 1, wherein the telephone mode is a standby mode.

3. A mobile telephone device according to claim 1, wherein the telephone mode is a mode of creation of an electronic mail.

4. A mobile telephone device according to claim 1, further comprising a receiver for receiving the video data.

5. A mobile telephone device according to claim 1, wherein the first display setting information stored in the memory comprises information on the value set by a user in the previous display mode.

6. A mobile telephone device according to claim 1, wherein the first and second sound setting information each includes at least a sound volume setting.

7. A mobile telephone device according to claim 1, wherein the second sound setting information in the telephone mode can be set to include setting information for outputting a ringtone at a predetermined sound volume, while the first sound setting information in the video display mode can be set not to include the setting information for outputting the ringtone, or to include different sound volume information.

8. A mobile telephone device according to claim 1, wherein the first sound setting information can be changed when the video in the video display mode is displayed, and the first sound setting information set when the video display mode is selected is a final changed sound setting information set when a previous video display mode is terminated before the video display mode is selected.

* * * * *